United States Patent
Jacquin et al.

(10) Patent No.: US 11,522,723 B2
(45) Date of Patent: Dec. 6, 2022

(54) SECURE PROVISIONG OF BASEBOARD MANAGEMENT CONTROLLER IDENTITY OF A PLATFORM

(71) Applicant: Hewlett Packard Enterprise Development LP, Houston, TX (US)

(72) Inventors: Ludovic Emmanuel Paul Noel Jacquin, Bristol (GB); Nigel John Edwards, Bristol (GB); Luis E. Luciani, Jr., Tomball, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 122 days.

(21) Appl. No.: 17/188,047

(22) Filed: Mar. 1, 2021

(65) Prior Publication Data
US 2022/0278855 A1 Sep. 1, 2022

(51) Int. Cl.
H04L 9/32 (2006.01)
(52) U.S. Cl.
CPC .................................. H04L 9/3268 (2013.01)
(58) Field of Classification Search
CPC .................................................... H04L 9/3268
See application file for complete search history.

(56) References Cited

U.S. PATENT DOCUMENTS

| 9,384,367 | B2 | 7/2016 | Swanson et al. |
| 9,935,945 | B2 | 4/2018 | Li |
| 9,967,749 | B2 | 5/2018 | Taylor et al. |
| 10,366,025 | B2* | 7/2019 | Rahardjo ............. H04L 9/0844 |
| 2004/0073806 | A1* | 4/2004 | Zimmer ............... G06F 21/575 |
| | | | 713/189 |
| 2019/0095593 | A1 | 3/2019 | Cisneros et al. |
| 2022/0210229 | A1* | 6/2022 | Maddukuri ............ H04L 69/26 |

* cited by examiner

*Primary Examiner* — Nelson S. Giddins
(74) *Attorney, Agent, or Firm* — Hewlett Packard Enterprise Patent Department (57) ABSTRACT

Example implementations relate to a method and system for provisioning an identity certificate for a BMC of a platform. Based on the certificate signing request (CSR) received from the BMC, a certificate authority (CA) associated with the platform manufacturer may verify the identity of the security processor and private key of BMC. A cryptographic audit session log between a provisioning service of the platform and the security coprocessor of the platform is received along with the CSR at the CA implemented in a cloud system. The CA verifies the signature on the received cryptographic audit session log. After verification, validation tools at the cloud system determine a first time and second time associated with the security coprocessor. When the difference between the first time and the second time is below an expected time of cryptographic communication, the CSR is considered as a valid request and an identity certificate for the BMC is generated and transmitted to the platform.

20 Claims, 6 Drawing Sheets

SECURE PROVISIONG OF BASEBOARD MANAGEMENT CONTROLLER IDENTITY OF A PLATFORM

BACKGROUND

With increasing number of platforms being shipped to untrusted environments, several zero-touch solutions are being used for provisioning. Platforms can include electronic devices such as servers, edge devices, switches, storage arrays, etc. Zero-touch solutions allow untrusted operators at remote locations to deploy platform and manage the platform after secure authentication. For secure authentication, secure device identifiers associated with the platforms may be used. While deploying the platform, the platform can be authenticated by verifying the secure device identifiers and ensuring that the platform has the required identity certificates. The secure device identifiers are cryptographic identities used for authenticating the identity certificates on the platform. For securely provisioning a platform, a secure authentication device on the platform with the cryptographic identities may be used. For example, a Trusted Platform Module (TPM) is a secure authentication device that generates and protects cryptographic keys from unauthorized use. The TPM is used by platform in cryptographic operations. A Certificate Authority (CA) receives and confirms the secure device identifiers/cryptographic identities of the platform from the TPM before transmitting identity certificate for the platform. When a platform connects to a data center, the data center uses the information in the identity certificate to determine if the platform possesses the required device identifiers to establish the genuineness of the platform.

BRIEF DESCRIPTION OF THE DRAWINGS

Various examples will be described below with reference to the following figures.

Throughout the drawings, identical reference numbers may designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing examples only and is not intended to be limiting. As used herein, the singular forms "a," "an," and "the" are intended to include the plural forms as well, unless the context clearly indicates otherwise. The term "another," as used herein, is defined as at least a second or more. The term "coupled," as used herein, is defined as connected, whether directly without any intervening elements or indirectly with at least one intervening elements, unless otherwise indicated. Two elements may be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

For purposes of explanation of the present disclosure, certain examples are described with reference to the components illustrated in FIGS. 1-5. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 3 and 6 are an example and is not intended to be limiting. Additional or fewer operations or combinations of operations may be used or may vary without departing from the scope of the disclosed examples. Thus, the present disclosure merely sets forth examples of implementations, and many variations and modifications may be made to the described examples. Such modifications and variations are intended to be included within the scope of this disclosure and protected by the following claims.

The term "platform" used in the description below may be implemented using a server or group of servers, a workstation, a desktop computer, customized industrial machinery, or any computing device with a BMC and provisioning application/service/engine. Platforms are being shipped to remote locations, and the provisioning of the platform is being requested via zero touch solution (using cloud based services) by remote operators at a customer site. To establish integrity and authenticity of platforms, the platforms may be manufactured with a security coprocessor (for example, a Trusted Platform Module (TPM)). The identity information (e.g., Private Key and Public Key Certificate) in the security coprocessor of the platform are verified to establish the integrity and authenticity of the platform once the OS is running.

An identity certificate is issued and signed by a Certificate Authority (CA) associated with the manufacturer of the platform. The identity certificate may include an identity of the platform and a private key associated with the platform along with details such as issuer details, issuer signature and certificate policies.

The platform is authorized based on identity certificate. However, traditionally, the baseband management controller (BMC) of the platform does not have an identity certificate and the BMC is not verified. Verifying the identity of the BMC separately from the identity of the platform can help in confirming that BMC of other platforms are not being used. The BMC 110 and the platform 102 run operating systems independent from each other and may request services from a cloud system independently. The BMC does not have access to the platform's identity certificate. Further, if both the public key of the BMC and the public key of the security processor of the platform are verified to be from the same platform, the overall trust in the platform requesting provisioning at a remote authority such as the cloud system increases. Hence, it is important that the private key of BMC of the platform is verifiable by the cloud system before provisioning access to resources. If the BMC has an identity certificate, it can be verified before processing the provisioning request from the platform.

In general, embodiments disclosed herein may relate to a method and system for provisioning an identity certificate for a BMC of a platform. A manufacturer may choose to provision the identity certificate for the BMC of the platform for the security reasons discussed above. In some examples, the provisioning can occur towards the end of a manufacturing process, for example, at a factory. The platform can be brought up and the BMC can be configured to send a certificate signing request (CSR) to the CA. Based on the CSR received from the BMC, the CA associated with the platform manufacturer may verify the identity of the security processor and private key of BMC before providing an identity certificate to the BMC.

When provisioning the BMC, it is important to keep verifiable proofs that the BMC hosts a particular identity key and is physically collocated with a trust element of the platform (e.g., a security co-processor). In certain examples, time stamps in one or more logs can be used to determine colocation. A cryptographic audit session log between a provisioning service of the platform and the security coprocessor of the platform is received along with the CSR at the CA implemented in a location remote from the platform, for example, at a cloud system. The CA verifies the signature on the received cryptographic audit session log. After verification, validation tools at the cloud system determine a first time associated with the security coprocessor when a provisioning protocol is initiated with BMC. A second time associated with the security coprocessor is determined when a private key challenge protocol is completed with the BMC. The CSR is validated based on a difference between the first time and second time. When the difference between the first time and the second time is below an expected time of cryptographic communication, the CSR is considered as a valid request and an identity certificate for the BMC is generated and transmitted to the platform. In addition, using the cryptographic audit session log, the CA verifies if the nonce signed by the private key of the BMC is the nonce generated by security coprocessor.

After the BMC is provisioned, the platform can be shipped to a customer site and be used in a production environment. When the BMC of the platform communicates with the cloud management service, the cloud system can verify if the BMC communicating is the BMC of a genuine platform requesting provisioning based on the identity certificate.

The provisioning of identity to BMC has several advantageous as the BMC of the platform is the first to connect to the cloud management service (hosted in a cloud system) associated with the platform. Without an identity certificate for the BMC, attackers may use the BMC of a verified platform to provision platforms which are being manufactured by other companies. Moreover, without the identity certificate, it would be difficult to know whether the BMC of a first platform is being used for provisioning a second platform.

Figure 1:
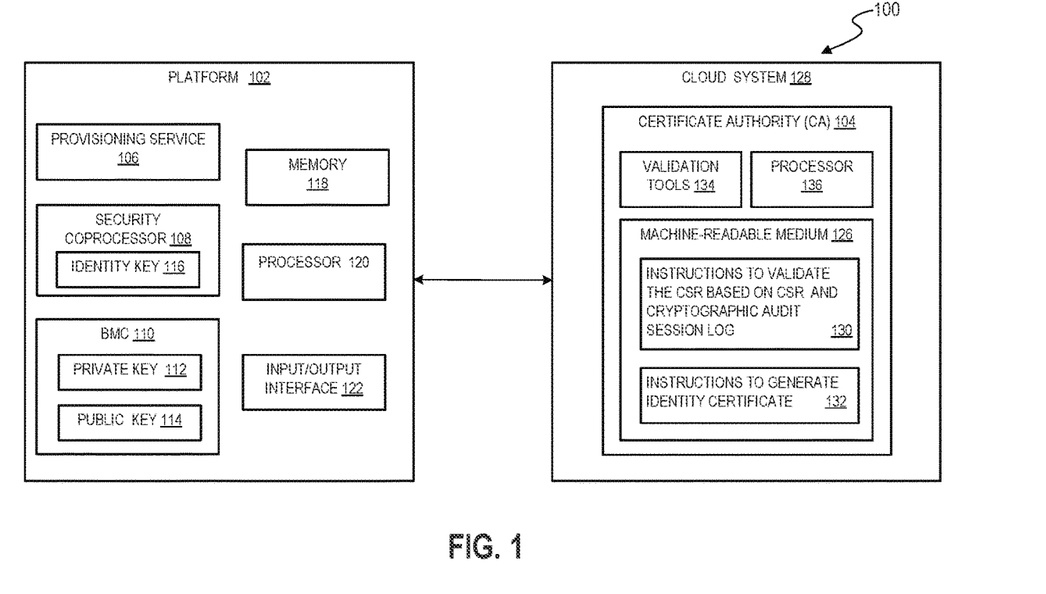
FIG. 1 is an example system for securely provisioning identity of a Baseband Management Controller (BMC) in a platform.

Referring now to FIG. 1, an example system 100 for securely provisioning identity of a BMC in a platform is shown. The platform 102 is a computing device with a security coprocessor 108 and a provisioning service 106 running on the host Operating System (OS) of the platform 102.

The platform 102 additionally includes a memory 118, one or more processors 120, input/output interfaces 122, and a BMC 110 that includes a private key 112 and a public key 114. The processor 120, the security coprocessor 108 and the memory 118 may be connected via a bus (not shown).

The processor 120 of the platform may be, one or multiple central processing unit (CPU), one or multiple semiconductor-based microprocessor, one or multiple graphics processing unit (GPU), other hardware devices suitable for retrieval and execution of instructions stored in machine-readable storage medium 126, or combinations thereof. The processor 120 is independent from the processor (not shown) of the BMC 110 and the security coprocessor 108. A platform firmware, for example, a Unified Extensible Firmware Interface (UEFI) firmware running in the processor 120 of the platform receives instructions from the cloud system 128 to authenticate each device of the platform, e.g., to check that the device is made by an authorized party in an authorized manner and the results of the authentication are stored in the security coprocessor 108.

The security coprocessor 108 may be an embedded microcontroller for providing a secure execution and storage environment for provisioning, licensing and preventing unauthorized usage of restricted software. The implementation of security coprocessor 108 may be consistent with the Trusted Platform Module (TPM) criteria conceived by Trusted Computing Group. In an embodiment, the security coprocessor 108 may be implemented as circuitry within a separate chipset. The security coprocessor 108 comprises of firmware that runs on the microcontroller in a secure execution environment and provides a secure storage area which is protected from tampering by user level programs, the operating system (OS), or the basic input/output system (BIOS) running on the processor 120 within the platform 102. The secure storage may comprise any type of memory. In an embodiment, the secure storage may store cryptographic keys and other data which may be used for authentication or licensing purposes. More details with respect to the functions of the security coprocessor 108 in the present disclosure are discussed in conjunction with FIGS. 2, 4 and 5.

The BMC 110 may be a service processor, which is capable of monitoring a current state of the platform 102 with the help of one or more sensors. In some examples, the BMC 110 may be embedded within a main circuit board or a motherboard (not shown) of the platform 102 to be monitored. The BMC 110 may also be powered by an auxiliary power rail (not shown), even when the platform 102 is switched-off. The BMC 110 runs independent of a processor 120 of the platform 102 and hence in any event of processor, memory or any other hardware failure, the BMC 110 can still provide the services.

Further, the BMC 110 can include a private key 112 and public key 114. In one example, the private key 112 and public key 114 are stored inside a secure storage of the BMC 110. In another example, the private key 112 and the public key 114 can be set during a provisioning of the platform 102, for example, at a first boot up at a manufacturing site or at another time. The values can be written to a write once register on the same Application Specific Integrated Circuit (ASIC) as the BMC 110. The write once register can be implemented, for example, using fuses. In one example, the private key 112 is created by executing an algorithm using random sources and is programmed.

The public key 114 and the private key 112 are created together as a pair and work together during the SSL/TLS handshake process (using asymmetric cryptography) to set up a secure session. The private key 112 is stored in a secured storage and kept as a secret and is available only at the BMC 110. The public key is distributed widely and is a part of the TLS certificate, and works together with the private key 112 to make sure that the data is encrypted, verified and not tampered with. Anyone with access to the public key 114 (i.e. the certificate) can verify that the digital signature is authentic without having to know the secret private key.

For provisioning identity of the BMC 110, the BMC 100 signs a X.509 CSR and transmits it to the provisioning service 106. The CSR is signed by the private key 112 of the BMC 110. The CSR is used by the CA 104 as the source of X.509 attributes of the BMC 110 of the platform 102. The public key of the BMC 110 is included in the CSR and the private key is used to digitally sign the X.509 CSR.

In accordance to the embodiments of the present disclosure, to validate the identity of the BMC 110 and for issuing identity certificate, the security coprocessor 108 with identity key 116 of the platform 102 is used while generating the CSR by the BMC 110. As the identity key 116 of the platform 102 stored in the security coprocessor 108 is trusted, it acts as a trusted proxy for provisioning the identity of the BMC 110 at the platform 102. For example, the identity key 116 in the security coprocessor 108 includes a private key and a public key. In an embodiment, a single CSR may be generated by the provisioning service 106 including the identity provisioning request of the BMC 110. More details about the CSR generation and transmission of the CSR to the CA 104 is discussed in conjunction with FIGS. 2 and 3 below.

The provisioning service 106 may be used for provisioning identities on the platform 102. In an example, the provisioning service 106 may be executed on the processor 120 during the final testing of each platform prior to shipping. The provisioning service 106 may be an application running on the processor 120 of the platform 102. The provisioning service 106 includes one of security/provisioning software running on the OS of the platform 102. In an implementation, the provisioning service 106 may be enabled via the BMC 110 as an out-of band service. In another implementation, the provisioning service 106 can be executed on the processor 120, for example, during boot up of the system. In some cases, code for the provisioning service 106 may be stored on flash memory, in a read only memory (ROM), etc.

The provisioning service 106 may be used for provisioning identities and licenses on the platform 102. In an example, the provisioning service 106 may be used for provisioning identities of the platform 102 and the BMC 110 during final testing stages of the platform 102 at the manufacturing site (e.g., a factory). The provisioning service 106 communicates with the security coprocessor 108 and the BMC 110 separately to gather required identity information. In an example, for provisioning identity certificate of the BMC 110, the provisioning service 106 receives a self-signed CSR from the BMC 110. In addition, the provisioning service 106 gathers a public key associated with the identity of the security coprocessor 108 and transmits the CSR of the BMC 110. The provisioning service 106 uses the input/output interface 122 to communicate with the CA 104 at the cloud system 128. A CSR from the BMC 110 is sent to the CA 104 at the cloud system 128.

The certificate authority 104 in the cloud system 128 receives the CSR from the BMC 110. The CA 104 may be part of cloud system 128 (As shown in the FIG. 1) of the hardware manufacturer who manufactured the platform 102. In some embodiments, the CA 104 may be implemented in a data center of the manufacturer.

In some implementations, the platform 102 may transmit a single CSR for requesting multiple certificates for the platform. For example, a single CSR may include request for identity certificate of BMC 110 and a request for platform certificate.

The validation tools 134 in the cloud system 128 are responsible for validating the CSR and confirming that the security coprocessor 108 is from a known supplier of the manufacturer. The validation tools 134 verifies the CSR to determine if the CSR is signed by a private key corresponding to the public key in the CSR. A processor 136 in the cloud system 128 executes instructions 130 and 132 stored in the machine-readable medium 126 for provisioning the identity of the BMC 110. The instructions 130 when executed causes the processor 124 of the cloud system 128 to validate the CSR based on a difference between the first time and second time associated with the security coprocessor 108. The first time and second time of the security coprocessor 108 may be extracted from the cryptographic audit session log received from the platform 102 at the CA 104.

The instructions 132 are executed when the CSR is valid. The CA 104 in the cloud system 128 issues a digital identity certificate to the BMC 110. In an example, the identity certificate may be digital certificate signed by the CA 104 (associated with the manufacturer of the platform).

The identity certificate transmitted by the CA 104 is signed using a public key belonging to the CA 104. Additionally, the identity certificate may be encrypted using the public key associated with the security coprocessor 108 when transmitted from the CA 104. This means that only the platform 102 with the correct security coprocessor 108 can decrypt the identity certificate. At the platform 102 once decrypted, the X.509 certificate is stored in plaintext. At the factory, the platform is tested and provisioned with identities for the BMC 110 and platform 102 before being shipped to customers.

When the platform is shipped to a customer site and the customer connects the platform 102 to the cloud system 128 for requesting resources or for requesting provisioning of the platform 102, the cloud system 128 can authenticate the identity information in the digital certificates to confirm that the platform 102 is trustworthy and authorize it before allowing access to the enterprise resources via the cloud system 128. In several cases, when connecting the platform 102 to the cloud system 128 for the first time, the operating system of the platform 102 is not running and the BMC 110 may be communicating with a service in the cloud system 128 to provision and manage the platform 108. When a BMC 110 with an identity certificate connects to the cloud system 128, the cloud system 128 can verify the genuineness of the BMC 110 and the platform 102 even before the platform 102 has an Operating System (OS) running.

Figure 2:
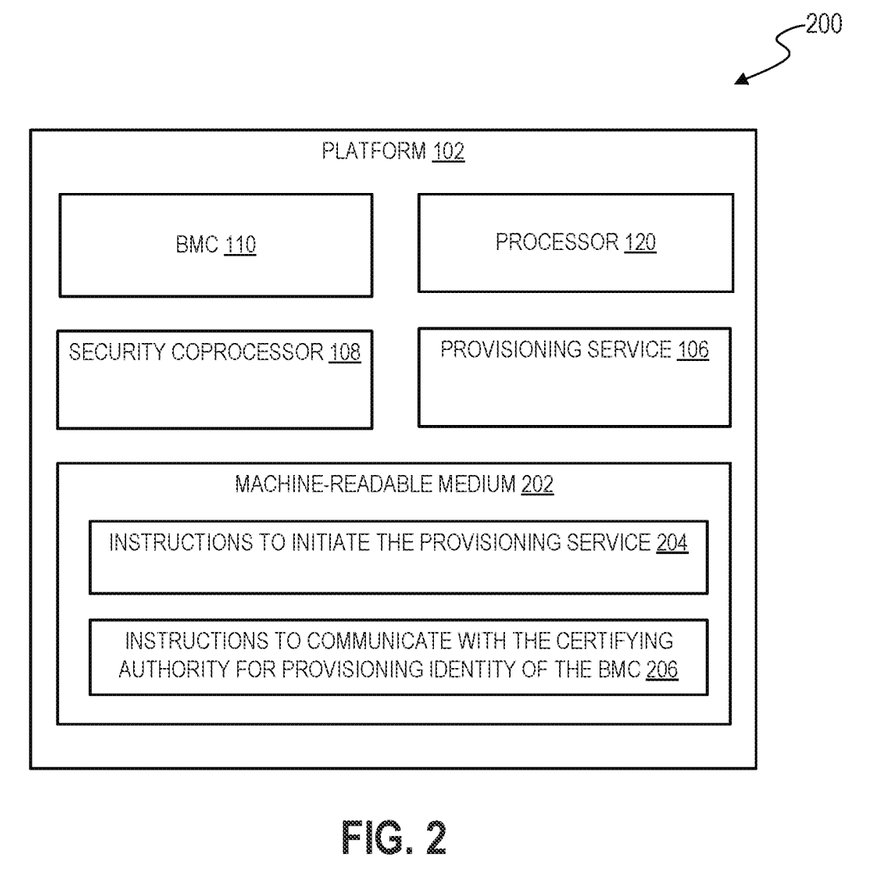
FIG. 2 is a block diagram of a platform with a processor operably coupled to a machine readable medium storing executable program instructions, in accordance with embodiments of the present disclosure.
Figure 3:
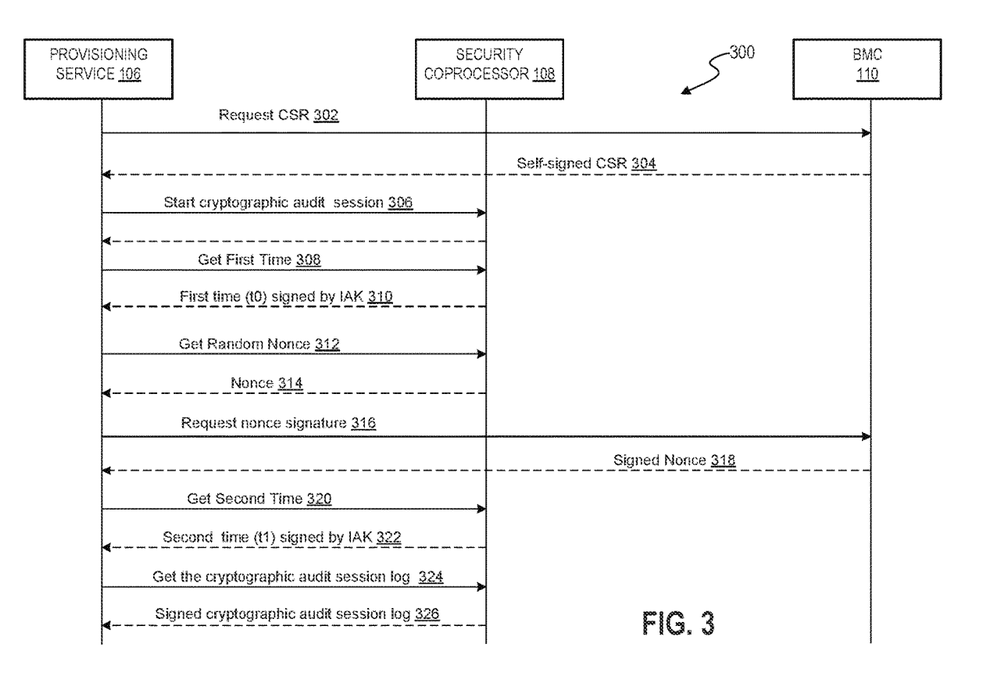
FIG. 3 illustrates a message flow diagram of a provisioning protocol used for generating Certificate Signing Request (CSR) at the platform requesting identity certificate for the BMC, in accordance with embodiments of the present disclosure.

FIG. 2 is a block diagram 200 of a platform 102 with a processor 120 operably coupled to a machine-readable medium 202 storing executable program instructions, in accordance with embodiments of the present disclosure. The provisioning service 106 receives a self-signed CSR from the BMC 110.

To ensure that the BMC 110 and the security coprocessor 108 are on the same physical platform, and possess the required verifiable proofs, the provisioning service 106 interacts independently with the BMC 110 and the security coprocessor 108. The verifiable proofs are present in the CSR sent from the platform 102 to the CA 104. The verifiable proofs includes the private key of the BMC and the identity key 116 of the security coprocessor.

The processor 120 of the platform 102 executes instructions 204 and 206 stored in the machine-readable medium 202 for provisioning the identity of the BMC. The instructions 204 when executed causes the processor 120 to initiate the provisioning service 106. The provisioning service 106 initiates an audited communication session with the security coprocessor 108 to create verifiable proof in the CSR requested by the BMC 110 using the security coprocessor 108. The verifiable proofs include the signed nonce (signed by the private key 112 of the BMC) and the signed cryptographic audit session log (signed by the identity key 116 of the security coprocessor 108).

The instructions 206 when executed cause the processor 120 to communicate with the CA 104 for provisioning the identity of the BMC 110. The provisioning service 106 uses the input/output interface 122 to communicate with the CA 104 at the cloud system 128. The identity key 116 of the security coprocessor 108 and the freshness of the BMC's 110 signature over the nonce are verified by the validations tools 134 in the cloud system 128 to validate the CSR request of the BMC 110. Using the security coprocessor 108 as a trusted element of the platform 102 allows the validations tools 134 to verify that the BMC 110 and the security coprocessor 108 are physically collated on the same platform 102.

Generating CSR with Verifiable Proof for BMC Identity Provisioning

FIG. 3 illustrates a message flow diagram 300 of a provisioning protocol used for generating CSR requesting identity certificate for the BMC 110 at the platform 102.

At step 302, the provisioning service 106 may request the BMC 110 for an X.509 CSR. The CSR contains information identifying the applicant and is signed by the private key the BMC 110. A self-signed BMC CSR is sent (step 304) by the BMC 110 to the provisioning service 106. Once the BMC CSR is received, the provisioning service 106 initiates a cryptographic audit session (step 306) with the security coprocessor 108.

When the provisioning protocol is initiated with the BMC 110 and a self-signed BMC CSR is received, the first command in the cryptographic audit session is to get (step 308) a time associated with an internal time of the security coprocessor 108. At step 310, a first time attested by the security coprocessor 108 is sent to the provisioning service 106. At steps 312 and 314, the provisioning service 106 requests the security coprocessor 108 for a nonce (e.g., a random number) and receives the nonce from the security coprocessor 108. At step 316, on receiving the nonce, the provisioning service 106 challenges the BMC to sign the nonce (or number) using the private key 112 of the BMC 110. At step 318, the BMC 110 sends the signed nonce to the provisioning service 106. At step 320, after a private key challenge protocol is completed with BMC 110 is finished at step 318, the provisioning service 106 sends a command to get (step 320) a time associated with the security coprocessor 108.

At step 322, a second time attested by the security coprocessor 108 is sent to the provisioning service 106. Finally the provisioning service 106 requests (step 324) for the complete cryptographic audit session log and receives (step 326) a signed cryptographic audit session log between the security coprocessor 108 and provisioning service 106. The entire audited session (e.g., cryptographic audit session log) is signed by the security coprocessor 108. When the CSR is transmitted from the platform 102 to the CA, the signed cryptographic audit session log (including protocol commands, parameters and responses) is sent to the CA 104. The CSR and audited session includes the verifiable proofs in the form of the signed nonce and the signed cryptographic audit session log.

Figure 4:
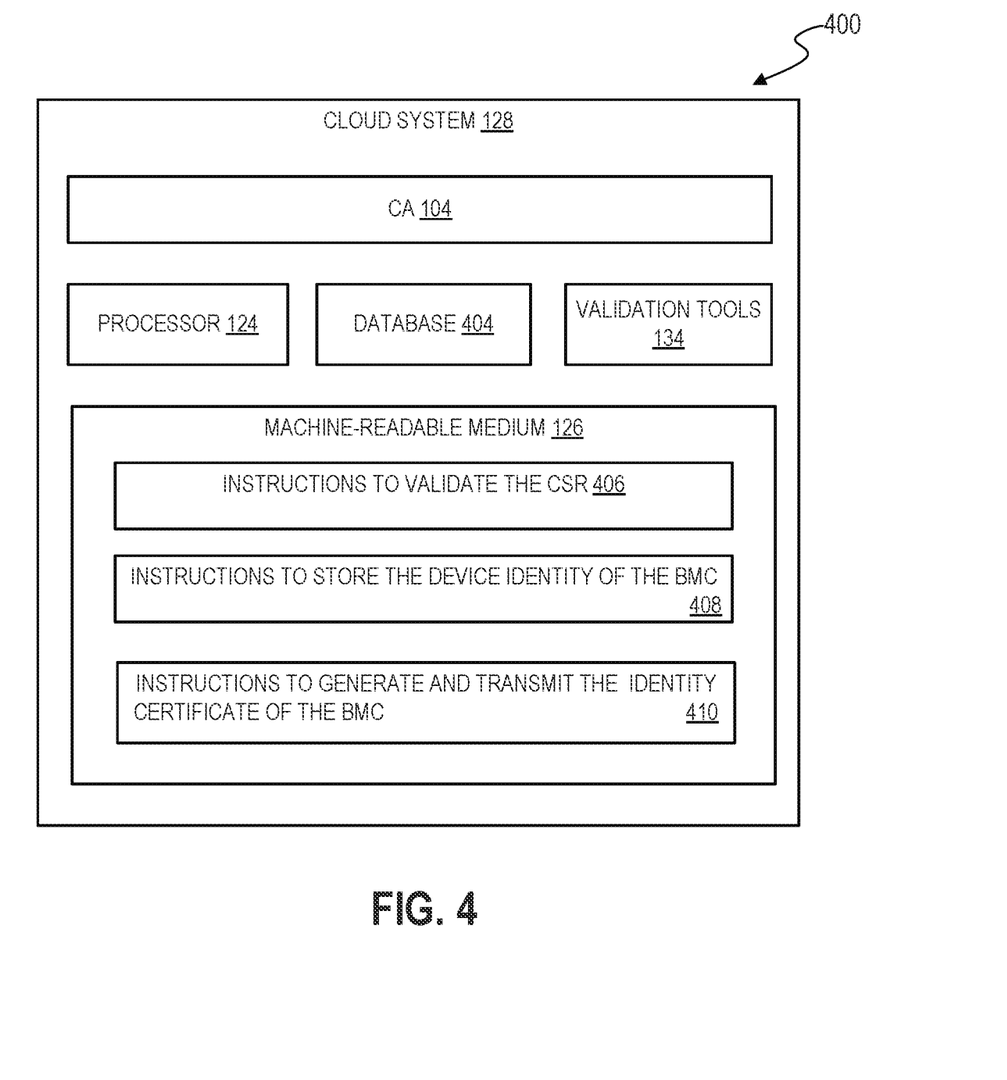
FIG. 4 is a block diagram of a cloud system implementing a certificate authority (CA), in accordance with embodiments of the present disclosure.

FIG. 4 is a block diagram 400 of a cloud system 128 providing a cloud management service to platforms 102. In some cases, the cloud system 128 includes the CA 104, the processor 124, a database 404, the validation tools 134 and the machine-readable medium 126. The machine readable medium 126 is non-transitory and is alternatively referred to as a non-transitory machine readable medium. In some examples, the machine-readable medium 126 may be accessed by the processor 124. The machine-readable medium 126 may be encoded with example instructions 406, 408, and 410.

Instruction 406, when executed by the processor 124, causes validation tools 134 at the cloud system 128 to validate the CSR request from the BMC 110. Using the cryptographic audit session log received at the CA 104, the validation tools 134 may initially verify if the cryptographic audit session log has been signed by the security coprocessor 108. Based on the cryptographic audit session log, the validation tools 134 may check if the provisioning service 106 has interacted with both the security coprocessor 108 and the BMC 110. Once the signature of the security coprocessor 108 is verified, the validation tools may determine a first time and a second time associated with the security coprocessor 108. The first time of the security coprocessor 108 is requested by the provisioning service 106 when the provisioning protocol is initiated with the BMC 110. The second time of the security coprocessor 108 is requested by the provisioning service 106 when a private key challenge protocol is completed with the BMC 110.

The validation tools 134 determine the freshness of the of the BMC's 100 signature on the nonce. The time taken to generate the signed nonce 318 (in FIG. 3) gets verified at the CA 104 based on a difference between the first time and second time. The difference between the first time and second time of the security coprocessor 108 indicates the time taken by the platform 102 to generate verifiable proofs of the BMC 110 and the security coprocessor 108. The time difference between the first time and second time indicates the freshness of the BMC's signature on the nonce. Verifying the freshness of the BMC's 110 signature on the nonce indicates the freshness of a signature. Hence, an older signature from the BMC 110 cannot be used for signing the nonce. When the difference between the first time and second time is below an expected time of cryptographic communication, the CA 104 in the cloud system 128 can verify that the BMC 110 and the security coprocessor 108 are part of the same chassis. In addition, using the time measurement (difference in first time and second time) for signing of the nonce prevents an attacker from forwarding the nonce to a different platform for signing.

The instructions 408 are executed when the CSR is confirmed to be a valid CSR. The cloud system 128 stores the device identity of the BMC 110 in the database 404. Once the device identity of BMC 110 is stored at the database 404 in the cloud system 128, the CA 104 generates the identity certificate for the BMC 110.

The instructions 410 when executed by the processor causes the CA 104 to generate and transmit the identity certificate of the BMC 110 to the platform 102. The identity certificate of the BMC 110 is encrypted using the public key of the security coprocessor 108. The security coprocessor 108 with the correct IAK can then decrypt the identity certificate of the BMC 110. Hence, only the platform 102 and security coprocessor 108 used for generating the CSR can decrypt the identity certificate received from the CA 104.

Figure 5:
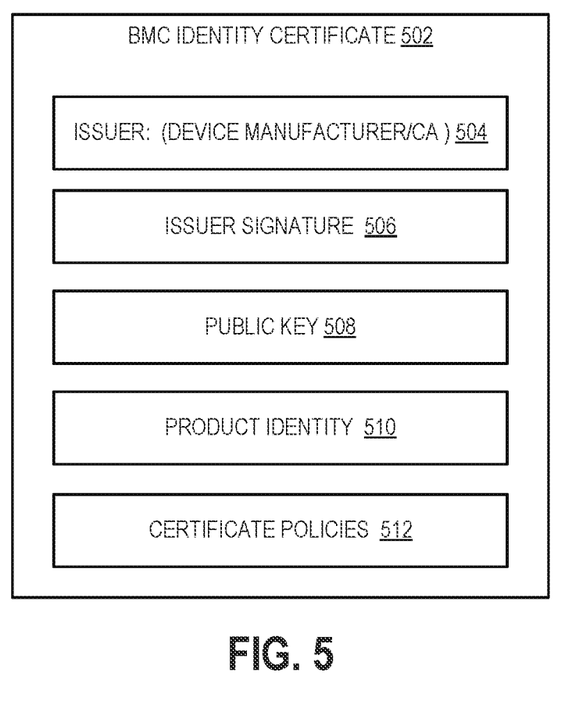
FIG. 5 is an example of a BMC identity certificate 502 generated for the BMC by the CA 104.
Figure 6:
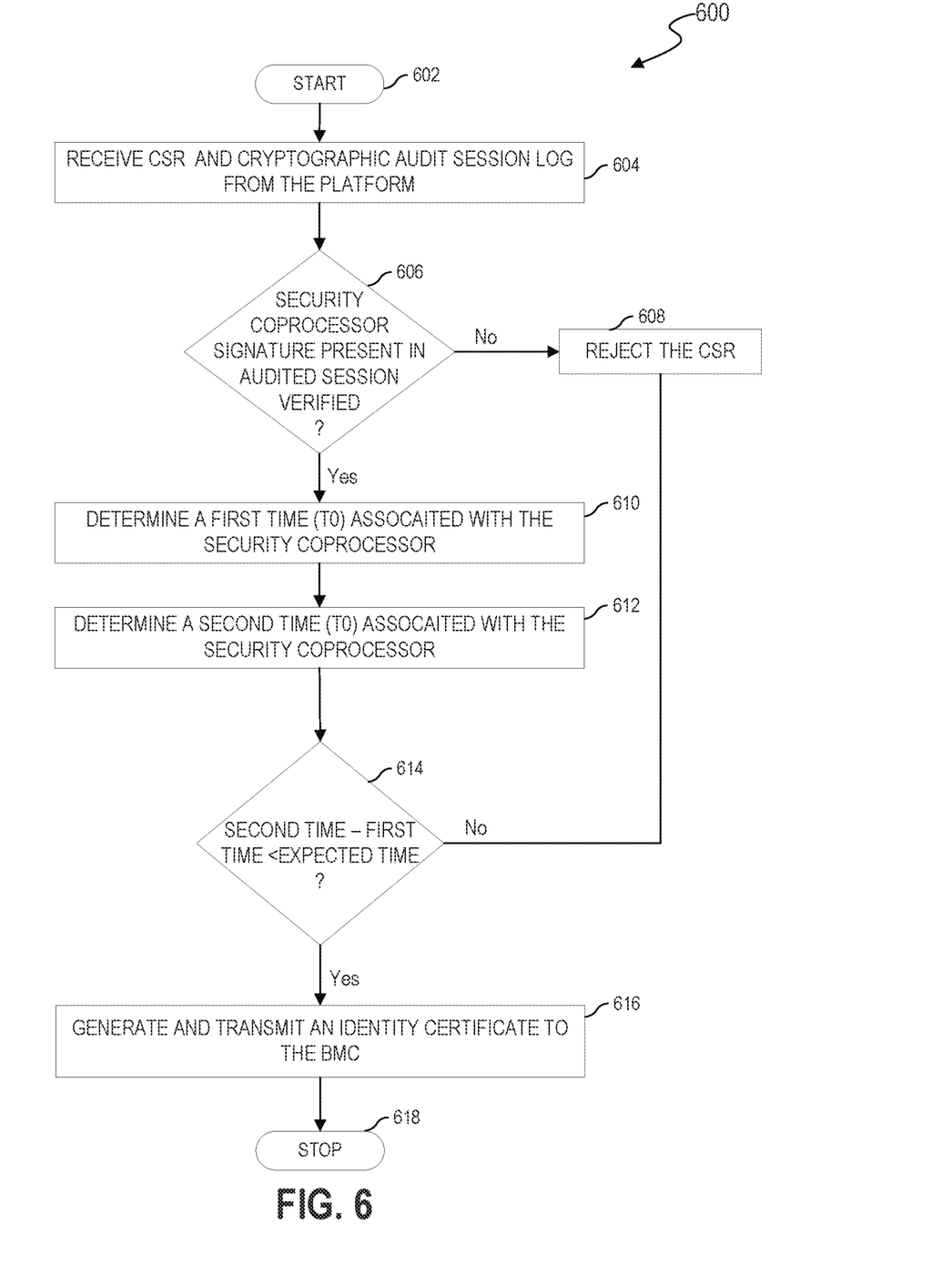
FIG. 6 is a flowchart of a method of validating a CSR request at the cloud system, in accordance to the embodiments disclosed herein.

FIG. 5 is an example of a BMC identity certificate 502 generated for the BMC 110 by the CA 104. The identity certificate 502 incudes a product identity 510 of the BMC 110 and a public key 508 of the BMC 110 along with details such as issuer 504 details, issuer signature 506 and certificate policies 512

The identity certificate 502 may be issued by the CA 104 (or a Registered Authority (RA)). In one example, the CA 104 may an external entity like a system integrator providing assurance that the platform and BMC is trustworthy. In another example, the CA 104 may be present in the cloud system 128 of the manufacturer of the platform 102.

The identity certificate 502 may be an X.509 digital certificate that includes various attribute fields such as the validity time period, signature algorithms used, serial number of the product, and chain of trust associated with the digital certificate 502.

The BMC 110 and the platform 102 run operating systems independent from each other and may communicate with different services at the cloud system 128 independently. From a customer site when the BMC 110 communicates with the cloud system 128, the information in the BMC identity certificate 502 allows the cloud system 128 to verify that the BMC 110 of platform 102 connecting to the cloud system 128 is genuine before providing access to the enterprise resources. The identity certificate 502 of the BMC 110 helps the cloud system in authenticating the genuineness of the platform 102 even before the platform's 102 processor is running.

FIG. 6 is a flowchart of a method 600 for validating a CSR request at the cloud system 128, in accordance to the embodiments disclosed herein. It should be noted herein that the method 600 is described in conjunction with FIGS. 1, 2 and 3. The method 600 starts at block 602 and continues to block 604. At block 604, the CA 104 implemented at the data center 128 receives the CSR of the BMC 110 and the cryptographic audit session log between the provisioning service 106 and the security coprocessor 108. At block 606, the CA 104 verifies the signature on the cryptographic session log. If the signature of the security coprocessor 108 is not verified, the CSR request is rejected (block 608). When the signature of the security coprocessor 108 is verified, the method 600 continues to block 610.

At blocks 610 and 612, using the signatures in the cryptographic audit session log, validation tools at the data center 128 can authenticate and determine the internal times (first time—T0 and second time—T1) of the security coprocessor 108. The first time is associated with a first internal timestamp of the security coprocessor 108. The first time of the security coprocessor 108 is requested by the provisioning service 106 when the provisioning protocol is initiated with the BMC 110. For instance, in FIG. 3 the provisioning service 106 requests for the internal time of the security coprocessor 108 when a self-signed CSR is received from the BMC 110 and an audited cryptographic session is initiated with the security coprocessor 108. The second time of the security coprocessor 108 is requested by the provisioning service 106 when the private key challenge protocol is completed with the BMC 110. For instance, in FIG. 3 the provisioning service 106 requests for the internal time of the security coprocessor 108 after signing of the nonce by the BMC 110. The BMC 110 is challenged by the provisioning service 106 to sign the nonce with its private key 112.

At block 614, the validation tools may apply a distance-bounding protocol which considers an expected time of the communication and commands executed between the two timestamps. Based on the difference between the first time and the second time, the validation tools may verify if the nonce was signed by the BMC's 110 private key 112 in a timely manner. When the difference between the second time and first time is less than expected time of the cryptographic communication, it indicates that the BMC 110 and the security coprocessor 108 are part of the same platform and that the platform 102 was not rebooted during the provisioning process. If the difference between the first time and second time is above an expected time of cryptographic communication, the CSR is rejected (shown in block 608).

At block 616, when the difference between the first time and the second time is below the expected time of cryptographic communication, the CA 104 generates the identity certificate for the BMC 110. The identity of the BMC 110 gets stored at the database 404 and then the CA 104 transmits the identity certificate to the platform 102. The identity certificate is encrypted using the security coprocessor's public identity key ensuring that only the platform 102 involved in generating the CSR can decrypt the identity certificate. This type of validation ensures that the BMC of a first platform is not using the security coprocessor 108 of another platform. The method ends at block 618.

The provisioning protocol described in method 600 is a single round trip certificate provisioning protocol. In a single trip all the steps from receiving CSR, validating the CSR, and transmitting the identity certificate back are completed. In addition, the single round-trip design may be used for secure in-field provisioning of identities for replacement of failing components such as the motherboard. The single round trip method of provisioning identity of the BMC 110 prevents delays during final testing stages at the factory. As the freshness of BMC's signature is verified by the signed nonce, there is no need for the CA 104 to issue any additional challenges to the BMC 110. The identity certificate is issued by the CA 104 based on the signed nonce and verification of the timestamps of the security coprocessor 108. Additionally, a single CSR may incorporate request for other identity certificates besides the CSR for BMC. A single-round trip reduces the time required for provisioning and final testing of the platform 102 at the factory. A single round trip protocol is described in the figures and description, however multi-round trip protocols may be used for provisioning the identity of the BMC 110.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

What is claimed is:

1. A method for provisioning identity of a Baseboard Management Controller (BMC), the method comprising:
   receiving, at a certificate authority (CA), a certificate signing request (CSR) from the BMC of a platform, wherein a cryptographic audit session log between a provisioning service of the platform and a security coprocessor of the platform is received along with the CSR;
   determining, from the cryptographic audit session log, a first time associated with the security coprocessor when a provisioning protocol is initiated with the BMC;
   determining, from the cryptographic audit session log, a second time associated with the security coprocessor when a private key challenge protocol is completed with the BMC; and
   validating the CSR from the BMC based on a difference between the first time and second time.

2. The method of claim 1, wherein the validating comprises of:
   determining if the difference between the first time and the second time is below an expected time of cryptographic communication;
   confirming that the BMC and the security coprocessor are part of a same platform when the difference between the first time and the second time is below an expected time of cryptographic communication; and
   generating an identity certificate for the BMC when it is confirmed that that the BMC and the security coprocessor are part of the same platform.

3. The method of claim 1, wherein the provisioning service comprises of provisioning software running on an operating system (OS) of the platform.

4. The method of claim 1, wherein the validating comprises of:
   rejecting the CSR if the difference between the first time and the second time is above an expected time of cryptographic communication.

5. The method of claim 1, wherein the validating comprises of:
   determining, from the cryptographic audit session log, if a nonce generated by the security coprocessor is same as the nonce signed by the BMC during cryptographic audit session.

6. The method of claim 5, wherein the difference between the first time and the second time indicates a freshness of a BMC's signature on the nonce, wherein the nonce is generated by the security coprocessor and signed by the BMC.

7. The method of claim 1, wherein the provisioning service communicates independently with the security coprocessor and the BMC of the platform.

8. The method of claim 1, wherein the cryptographic audit session log between the security coprocessor and the provisioning service is signed by the security coprocessor.

9. The method of claim 1, wherein the provisioning protocol uses a single round trip for provisioning the identity of the BMC.

10. A non-transitory machine-readable storage medium storing instructions executable by a processor of a cloud system, the machine-readable storage medium comprising instructions to:
    receive a certificate signing request (CSR) from a BMC of a platform, wherein a cryptographic audit session log between a provisioning service of the platform and a security coprocessor of the platform is received along with the CSR;
    determine, from the cryptographic audit session log, a first time associated with the security coprocessor when a provisioning protocol is initiated with the BMC;
    determine, from the cryptographic audit session log, a second time associated with the security coprocessor when a private key challenge protocol is completed with the BMC; and
    generate an identity certificate for the BMC when a difference between the first time and the second time is below an expected time of cryptographic communication; and
    transmit the identity certificate with a public key of the certificate authority to the platform.

11. The non-transitory machine-readable storage medium of claim 10, further comprising instructions to:
    reject the CSR if the difference between the first time and the second time is above expected time of cryptographic communication.

12. The non-transitory machine-readable storage medium of claim 10, wherein the provisioning protocol uses a single round trip for provisioning identity of the BMC.

13. The non-transitory machine-readable storage medium of claim 10, further comprising instructions to:
    determine if the difference between the first time and the second time is below an expected time of cryptographic communication;
    confirm that the BMC and the security coprocessor are part of a same platform when the difference between the first time and the second time is below an expected time of cryptographic communication; and
    generate an identity certificate for the BMC when it is confirmed that that the BMC and the security coprocessor are part of the same platform.

14. The non-transitory machine-readable storage medium of claim 10, further comprising instructions to determine if the provisioning service at the platform communicates independently with the BMC and the security coprocessor of the platform.

15. A method comprising:
    receiving, at a certificate authority (CA), a certificate signing request (CSR) from a BMC of a platform, wherein a cryptographic audit session log between a provisioning service of the platform and a security coprocessor of the platform is received along with the CSR;
    determining, from the cryptographic audit session log, a first time associated with the security coprocessor when a provisioning protocol is initiated with the BMC;
    determining, from the cryptographic audit session log, a second time associated with the security coprocessor when a private key challenge protocol is completed with the BMC;

verifying that the BMC and the security coprocessor are on a same chassis when a difference between the first time and the second time is below an expected time of cryptographic communication; and generating and transmitting an identity certificate for the BMC when the BMC and the security coprocessor are on a single chassis.

16. The method of claim 15, wherein the provisioning service comprises of provisioning software running on an operating system (OS) of the platform.

17. The method of claim 15, wherein the CA rejects the CSR if the difference between the first time and the second time is above an expected time of cryptographic communication.

18. The method of claim 15, wherein the cryptographic audit session log between the security coprocessor and the provisioning service is signed by the security coprocessor.

19. The method of claim 15, wherein the verifying further comprises:

determining, from the cryptographic audit session log, if a nonce generated by the security coprocessor is same as the nonce signed by the BMC during cryptographic audit session.

20. The method of claim 15, wherein the provisioning service communicates independently with the security coprocessor and the BMC of the platform and the provisioning protocol uses a single round trip for provisioning an identity of the BMC.

\* \* \* \* \*